April 12, 1960 SHIGERU OCHIAI 2,932,235

SYNCHRONIZED PICTURE FILM AND SOUND RECORD APPARATUS

Filed June 6, 1956 2 Sheets-Sheet 1

INVENTOR.
SHIGERU OCHIAI

BY Lippincott & Smith
ATTORNEYS

April 12, 1960 SHIGERU OCHIAI 2,932,235

SYNCHRONIZED PICTURE FILM AND SOUND RECORD APPARATUS

Filed June 6, 1956 2 Sheets-Sheet 2

INVENTOR.
SHIGERU OCHIAI

BY

Lippincott & Smith

ATTORNEYS

United States Patent Office 2,932,235
Patented Apr. 12, 1960

2,932,235

SYNCHRONIZED PICTURE FILM AND SOUND RECORD APPARATUS

Shigeru Ochiai, Osaka, Japan

Application June 6, 1956, Serial No. 589,793
Claims priority, application Japan June 9, 1955
1 Claim. (Cl. 88—16.2)

Figure 1:
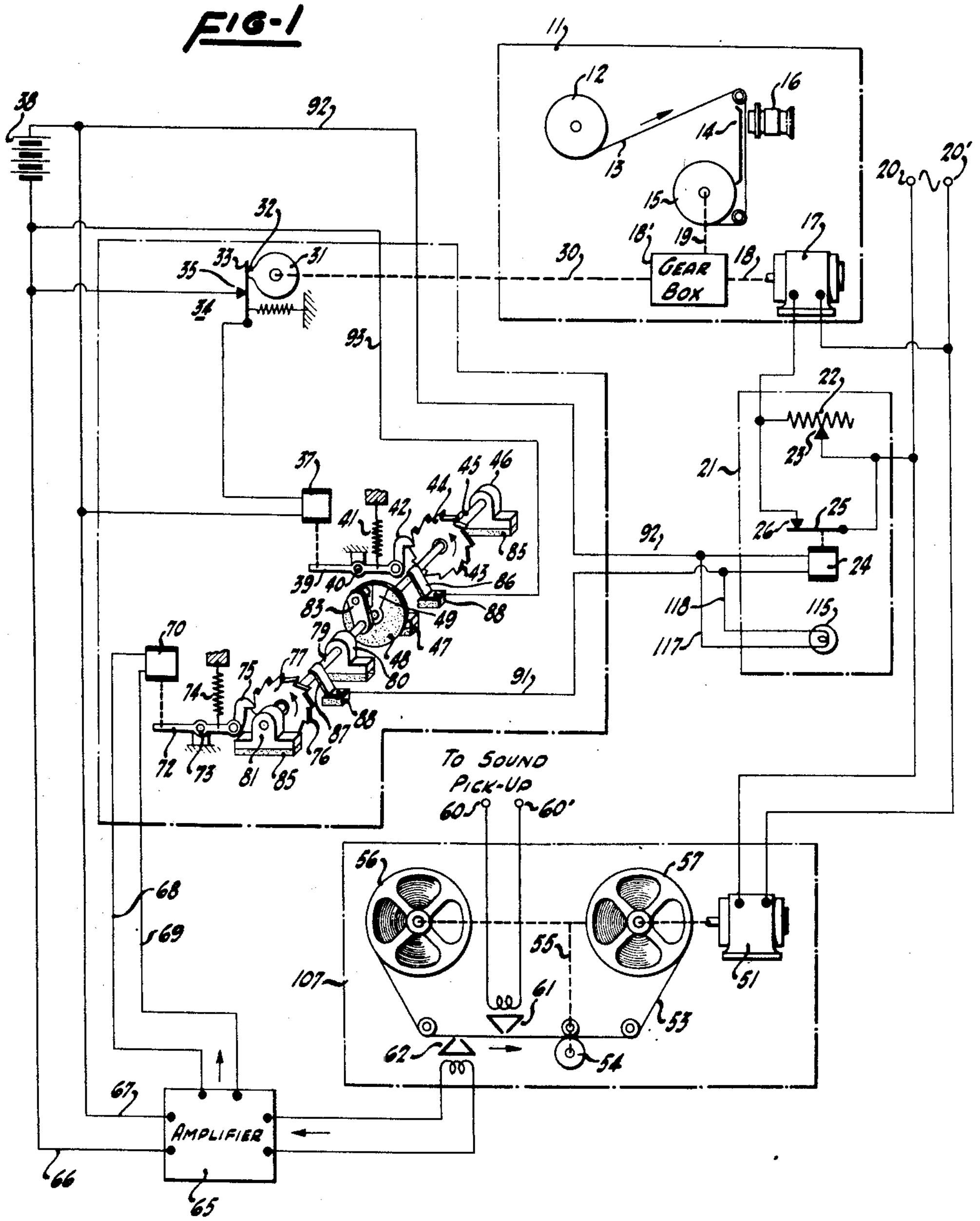

This invention relates to apparatus and circuitry for maintaining generally constant relationship in the relative speeds of moving strip records of the character used respectively to portray related records of a character to one of which the visual sense is caused to respond and to the other of which the aural sense is caused to respond.

In its particular application as herein to be disclosed the invention is directed to apparatus whereby motion picture records may be either made or projected on the one hand from one strip record and by which the accompanying or related sound may be recorded or reproduced from a related record strip driven independently of the strip bearing the pictorial information.

Apparatus for recording motion picture records and accompanying sound, particularly for use by amateurs where a relatively expensive installation is to be avoided, is obtained by photographing a scene or the like on a motion picture film record strip moving through a camera at any desired operating speed for later projection by suitable projection apparatus. Concurrently, a record of the accompanying or related sound may be recorded on a recording strip, such as a magnetic tape of well known character, by supplying the sound information to actuate a suitable transducer element or record head positioned adjacent to the tape thereby to record the sound information thereon, or in the case of sound reproduction, a transducer element or reproducer head is adapted to be placed adjacent to the moving tape or strip to reproduce the recorded sound information therefrom and through suitable amplifying devices to control a sound reproducing element.

As the invention is herein to be described a separate drive means is utilized to move each of the separate record strips at desired optimum rates of motion which may or may not (and usually are not) be the same linear distance per unit time. However, during any unit time period the linear movement of each separate strip is related to the movement of the other strip in a known relationship. Concurrently with each strip movement there is developed either directly from the strip or tape or in accordance with the actual movement of such strip a selected number of impulses during each unit time period. The number of such impulses from each tape corresponds when optimum relative tape or strip motions are maintained, and the impulses then bear a predetermined relative constant phase relationship to each other. The produced impulses serve to control relay mechanisms in any desired manner whereby through appropriate controls therewith associated the speed of one of the driving mechanisms may be accelerated or decelerated to return the controlled speed to a state whereby a selected optimum linear length of strip is moved per unit time through one of the instrumentalities such as the camera or the projector.

In a simplified form of the operation each of the recorded strips to carry the picture and the sound information, respectively, is driven from a separate driving means and a speed control mechanism or circuit is operatively associated with one of the elments so that the rate at which that element drives with respect to other elements may be brought to relative uniformity.

In the past it has been generally essential to require intricate optical elements as well as complex driving mechanisms for moving the components to provide each desired record and properly to phase separate recording elements. Operation of equipment including such complex elements is generally out of the question unless attended by a specially trained expert. This fact alone is sufficient to make apparatus of an expensive variety generally beyond the reach of the average individual and especially the amateur. It therefore becomes an object of the present invention to provide greatly simplified apparatus using generally known and standard components capable of being operated even by the relatively inexperienced for recording each of pictorial information and related sound on separate record strips, the recording on which may be selectively controlled.

It likewise becomes an object of the present invention to provide for the recording on one strip element pictorial information with a selected number of pictorial frames being recorded per unit time period and then to record the related sound record upon a separate strip with the sound related to each pictorial image allotted to pre-established sections or strip lengths of the sound recording strip element.

It also becomes an object of the present invention to provide for reproducing each of the so-recorded pictorial and sound records and through appropriate speed control devices associated with one of the drive means to maintain the desired speed relative relationship between the record media so that upon projection of the images recorded upon one of the strips the related sound shall be concomitantly reproduced.

Other objects of the invention are to provide simplified apparatus for recording and reproducing concurrently both pictorial and sound records so that the produced pictorial record can later be projected directly or can be translated into signals for transmission by any well known form of television pickup, with the previously recorded sound on the second record strip being reproduced for direct actuation of a sound reproducer or for the energization of a suitable communication channel over which the information is to be transmitted.

Other objects of the invention of course will suggest themselves to those skilled in the art to which the invention is directed when considering the following description in conjunction with the hereinafter appended claim and the accompanying drawing. By the drawing Fig. 1 is a schematic representation of apparatus and circuitry for photographing images upon a film strip record and simultaneously recording the related sound record on a separate strip record with provision for establishing a control of the relative drive speed of each of the moved strip records; and, Fig. 2 is a view generally similar to that shown by Fig. 1 of apparatus and circuitry for achieving a projection of previously recorded pictorial information placed upon a strip record and reproducing concurrently therewith from a separate strip the accompanying sound recording together with similar means to maintain relative drive speeds for the two record strips.

Figure 2:
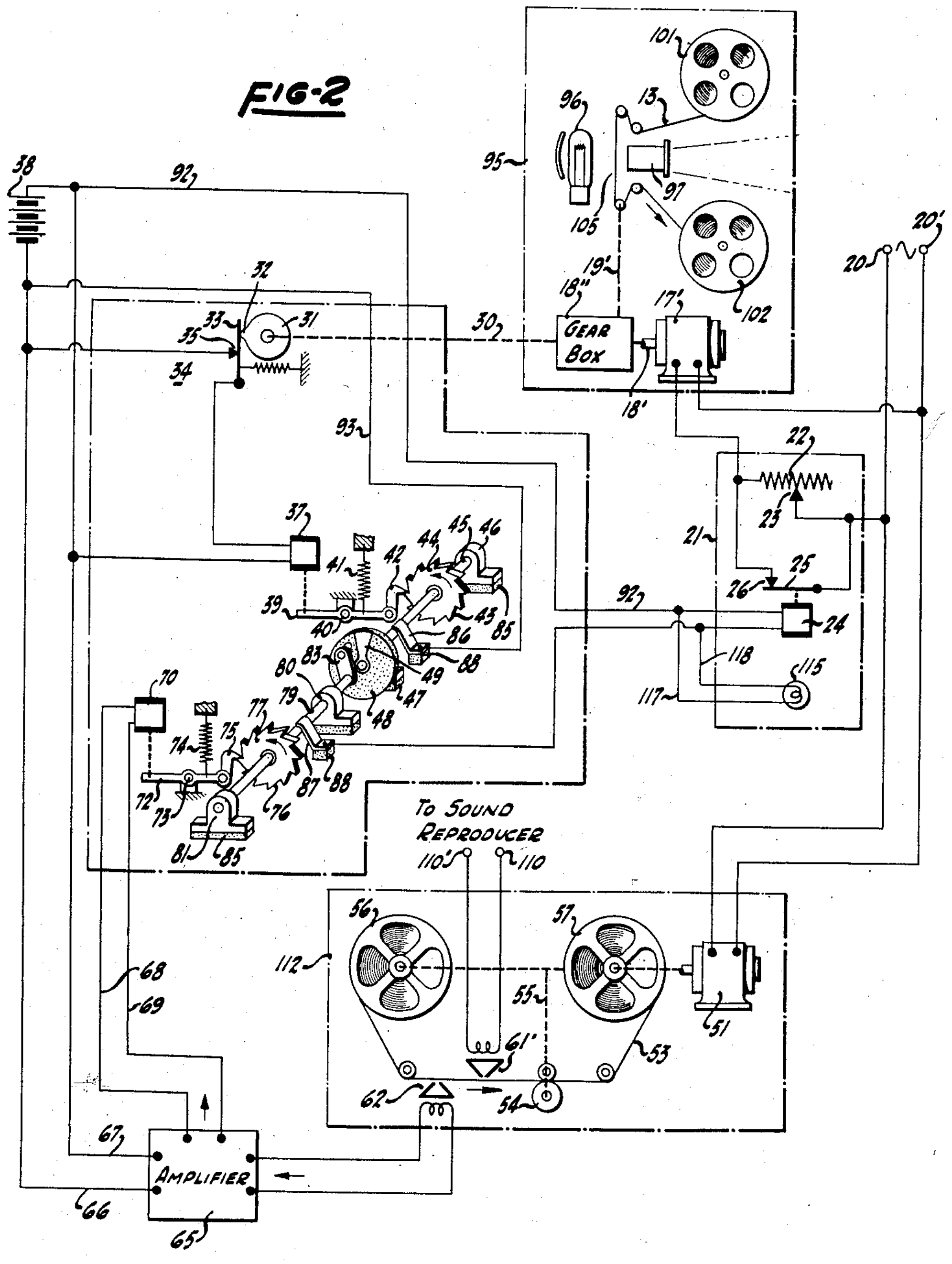

Referring now to the drawings for a further understanding of the invention and first to Fig. 1 thereof, a motion picture camera device is conventionally illustrated within the rectangle 11. It comprises, in extremely schematic and generally diagrammatic form here shown, the well known film storage reel 12 upon which a continuous strip of film 13 is adapted to be wound to be drawn through a gate 14 by any appropriate drive mechanism (not shown) and thence to be wound upon a take-up reel 15. As the film strip 13 moves through the film gate 14 the pictorial records are photographed thereon in well known fashion as a series of frames when the scene is focused by a suitable optical system schematically designated at 16. None of the intermittent motion mechanism for driving the film 13 through the schematically shown gate 14 has been shown since the camera mechanism is of well known sort and is, per se, not a part of the present invention.

The camera, however, is driven under the control of a drive motor conventionally represented at 17 driving through the schematically represented shaft connections 18 and 19 and the gear box 18' so that normally the driven film moves through the film gate 14 at a rate of $n$ unit lengths per unit time $t$. The drive motor 17 is energized from any desired source of alternating current (not shown) which may be connected at the input terminals 20, 20' for driving the motor through the indicated connections.

The motor has connected therewith a speed control mechanism schematically represented at 21 which comprises a variable resistor element 22, the tapping point 23 on which may be adjustably changed. The resistor element 22 is provided with a short-circuiting connection comprising a relay element 24, later to be described, having the movable armature 25 arranged to make-and-break contact with a contactor 26 with the making and breaking of the contact controlled by the energization of the relay 24, as will also later be explained.

There is also driven from the motor by the conventionally indicated drive connection 30 and at a speed proportional to the film frames moving through the gate 14 in a unit time period to a rotary contactor element 31 having a projection 32 at one portion on its periphery. The projecting member 32 is adapted to cause the armature 33 of a relay 34 to close against a contactor 35 once during each rotation, operating against the passing force of any suitable restraining element. The rotary contactor element 31, as driven under the control of the driving shaft 30, rotates at a speed which illustratively produces one relay closure during each period that the drive means 19 for drawing the film 13 on to the take-up reel 13 and through the gate 14 moves the film strip 13 $n$ units of length per unit time period $t$.

The relay 34, when the armature 33 closes against the contactor point 35 closes a circuit through a relay winding 37 which is established through the indicated connections so that the source of current, conventionally represented by the battery 38, energizes the relay 37 to move the rocker arm 39 in a clockwise direction about a pivot point 40 against the restraining force of a spring element 41. Movement of the rocker arm 39 under the influence of the relay 37 causes the pawl 42 to engage one of the teeth 43 of a ratchet 44 to rotate the ratchet wheel in a counter-clockwise direction through an angular distance corresponding to the angular separation of two adjacent teeth 43.

The ratchet wheel 44 is carried upon a shaft 45 supported at its ends in suitable bearings 46, 47 (the latter being only partially shown). A disk 48 formed of insulating material and having an electrically conductive strip 49 formed thereon overhangs the bearing member 47 in cantilever relationship and is adapted to rotate with the shaft 45 and thereby to turn in a counter-clockwise direction an angular distance corresponding to that of the ratchet wheel with each energization of the relay 37.

Concurrently with the driving motion of the film strip 13 by the motor 17 a second motor 51, which is preferably of the synchronous variety, also is connected to be energized from the source of current (not shown) which is connected to the terminal points 20 and 20'. The motor 51 drives a magnetic record tape 53 in any conventional manner illustratively to move the tape in the direction indicated by the arrow. The motor 51 drives the tape preferably by means of a driven capstan 54 turned in well known manner, as conventionally shown by the indicated dotted line connection 55, the precise operation of the capstan drive not being shown here in detail due to its well known character and it being understood that the capstan drives the tape strip 53 by pressing it against an idler roller. The capstan is usually directly driven from the motor, although step-up or reduction gearing may be used if desired.

So driven, the magnetic tape 53 is adapted to unwind from the storage reel 56 and to be wound upon a take-up reel 57; a direct drive to rotate the wheels may or may not be provided, the important factor being the driving of the capstan 54. Sound pickup apparatus of any desired character (not shown) is adapted to supply the sound record relative to the scene depicted upon the optical system 16, for instance, and to supply signals indicative of this sound record (with whatever amplification may be desired) to the input terminal points 60 and 60' which are connected to energize the conventionally represented transducer 61 of well known character to serve as a recording head for producing a magnetic record of the sound upon the magnetic strip record 53.

Prior to recording on the magnetic record strip 53 there has been recorded thereon, in any suitable manner not shown, suitable indicia which can be utilized for the purpose of effecting speed control in a manner later to be described. The recorded indicia adapted to produce pulses in the output of the transducer 62 to indicate strip speed are spaced along the record strip by any desired spacing with the spacing being such that any selected number of pulses are picked up by the transducer 62 during the time the strip 53 is moved through a pre-selected linear length of strip which may be considered as $m$ unit lengths per unit time period $t$. The number of pulses picked up may be of any desired number but preferably should correspond for optimum driving speed to the number of pulses produced in a like time period by closures of the armature 33 of relay 34 upon the contactor 35, which closures are effected and determined in accordance with the rate of advance of the picture record strip under the control of the drive motor 17.

The records or indicia on the strip 53 serve to indicate the rate at which the magnetic record strip 53 is moved past the transducers 61 and 62, it being understood that the recordings to indicate strip speed are provided on a separate track from that along which the sound recordings are to be impressed by the transducer recorder head indicated at 61. The indications of the movement of the strip 53 past the transducer 62, when picked up, are supplied to any conventional form of amplifier device, indicated herein conventionally at 65, for amplification. The amplifier 65 is indicated as having its operating voltage supplied by way of conductors 66 and 67 from the source 38, although it is apparent that this is purely a conventional representation and any other source of power supply may be utilized.

The output from the amplifier 65, representing suitably amplified pickup pulses derived from the transducer 62 is then applied by way of conductors 68 and 69 to actuate a relay device 70. Energization of relay 70 is adapted to rotate the rocker arm 72 (which is associated with the relay as an armature) about its pivot point 73 against the influence of a spring 74 to cause the pawl 75 to engage one of the teeth 76 of a ratchet 77. Engagement of the pawl 75 with any tooth 76 produces a counter-clockwise rotation of shaft 79 each time the relay 70 is energized, with the angular rotation being determined by the angle between adjacent teeth 76. The shaft 79 is suitably supported in bearings, as conventionally indicated at 80 and 81, with a brush contactor 83 extending outwardly as a cantilever from one shaft end.

The brush contactor 83 is adapted to rest against the surface of the disk 48 and to contact it so that at certain time periods corresponding to a departure from identical relative times of energization of relays 37 and 70 the contactor 83 will rest against the conductive section 49 on the disk 48. In electrical contact with each of the shafts 45 and 79, which shafts are electrically conducting and thus insulated from ground by the indicated insulation 85 under each of the bearing elements, there is a pair of contact brushes 86 and 87. The brushes 86 and 87 are supported upon base members 88 serving to insulate each base member from ground. Conductor 91 connects one terminal of the relay 24 to the brush 87 while the other terminal of this relay is connected via conductor 92 to one terminal of the source 38; the other terminal of the source 38 being connected via conductor 93 to the second brush 86. These connections make possible the closure of a circuit through the relay 24 when the brush 83 and the contact segment 49 are in overlapping relationship, it being clear that the conducting segment 49 is in electrical contact with the shaft 45 and that the brush 85 is in electrical contact with the shaft 79. At times of circuit closure due to overlapping contact between the brush 83 and the conductor strip 49 the relay 24 is energized. Energizing of the relay 24 serves either to open or close the contact between the armature 25 and the contact point 26 depending upon the connections and the direction of winding of the relay and upon the manner in which operation is desired.

It may be assumed, illustratively, that the motor 17, subjected to control by the speed control 21, normally operates at a speed very slightly above synchronous speed, which may be considered the desired optimum speed. As illustrated, this is a condition where resistor 22 is shorted by armature 25 closed on contact 26. Then, upon energization of the relay 24 due to the establishment of contact between strip 49 and brush 83 energizing relay 24, the contact between armature 25 and contact 26 is broken which brings the control resistor 22 into operation. The motor 17, for this condition, may then be assumed to operate at just less than synchronous or optimum speed.

If the motor is assumed to run too fast, that is, above synchronous or optimum speed, the operation of relay 24 from time to time causes the speed to be reduced. Then, the speed is later increased due to de-energization of relay 24 due to breaking contact between the strip 49 and the brush 83. This making or breaking of contact occurs as the conducting strip 49 is continuously stepped under control of relay 37 and the stepping motion applied by the pawl and ratchet elements while with energization of the relay 70, assumed to occur at the desired rate, the brush 83 is similarly moved. The relative movements serve to make and break the contact to control the speed of the motor 17.

If the motor 17, for instance, is running faster than synchronous speed so that the contact between the armature 33 and the contactor 35 to energize relay 37 is established prior to the energization of the relay 70, the contact between the brush 83 and the conducting strip 47 will occur sooner with the result that the energization of the relay 24, if the connection between the armature 25 and the contactor 26 be assumed initially to be closed, its opening will slow down the motor. The arrangement provides that with variances in the relationship between the energization of the relays 37 and 70 control of the relay 24 is established.

Relative variances in speed between the desired unit length of strip motion per unit time of the strips 13 and 53 cannot initially be detected by either the eye or the ear. Therefore, the control herein set forth provides that the correction is established prior to the time relative speed discrepancies would be discernable to the average person. The control dispenses with the necessity of placing on the strip to record the optical image indications which otherwise would be necessary to establish the desired relationship of strip motion. Without the necessity of the complexities a smooth and satisfactory operation for long periods of use can be insured with an extremely simple component arrangement.

Referring now to the reproducer portion of the apparatus depicted particularly by Fig. 2, it will be observed that the components there used are generally similar in nature and like parts and like functioning parts are represented by like members. In connection with the reproducer apparatus the camera 11 of the pickup device has been replaced by a projector conventionally shown at 95 with a suitable projection lamp 96 with reflector schematically indicated in association with the conventionally represented optical system 97. The film strip having the pictorial information thereon is so driven or pulled that it rolls off a storage reel 101 and onto a take-up reel 102 under the control of a drive motor herein designated as 17'. The film is advanced in any well known manner by way of a drive connection indicated at 19' to move the film through the film gate mechanism 105.

Also at the reproducer end of the system for reproducing records preferably made to record each of the pictorial information, as by the camera 11, and the sound reproducer apparatus which is shown in its entirety and conventionally at 112, the transducer head 61 used as a recorder head with the camera unit of Fig. 1 is replaced by a transducer head 61' serving as a reproducer head. The output of the transducer 61' is fed to output terminals 110 and 110' there to be connected to a suitable sound reproducer of any desired characteristic (not shown).

The transducer 62 in the reproducer apparatus conventionally shown at 112 functions in a manner similar to the transducer 62 of the record apparatus. Occasionally, for purposes of visually indicating whether or not the drive motor 17 for the camera and 17' for the projector is being speeded up or slowed down, a visual control may also be provided by way of a lamp 115 which is energized by the indicated connections 117 and 118 in a way suitable to provide illumination concurrently with the relay energization.

Speed differences between the projector or camera apparatus on the one hand and the sound reproducer or sound recorder apparatus on the other hand are changed into electrical displacements by the described invention and caused to control the speed of the drive motor system used for effecting driving motion on the apparatus.

While the apparatus of the character herein described functions in the preferred fashion, it also will be appreciated that various modifications may be made in the described system without departing from the spirit or scope of the invention. In one form of modification the control may be changed in a way to provide that the relay contact armature 33 is closed upon the contact point 35 for approximately one-half of each rotation of the rotary contact element 31 to energize the relay element 37. Similarly, the previously recorded speed control pulses on the magnetic record strip 53 may serve to energize the transducer head 62 for one-half the period allotted to a strip movement of $m$ unit strip lengths per unit time $t$. These pulses, when amplified in the amplifier 65, are used to control the operative periods of the relay 70.

In this form of operation the relays 70 and 37 have their operating armatures controlled in normal fashion. The contactor point of one relay is connected, however, to one terminal of the source 38 and the armature of the so-connected relay is connected to the contactor of the second relay with its armature then being connected to the opposite terminal of the source 38 through the winding of relay 24. This form of connection provides a circuit where with normal and optimum speed relationships and by properly phasing the initial operation of the relays so that relay 70, for instance, having its opening and closing established at the optimum speed closes following one-half the period of normal closure or energization of relay 37. Then, for one-quarter of any given time period $t$ relay 24 will be energized due to concurrent energization of each of relays 37 and 70 but with a departure in speed of film strip 13 relative to sound record strip 53 the concurrent energization of relays 37 and 70 will either advance or retard in time so that relay 24 is energized for greater or lesser periods of time. This form of control also permits a desired minor degree of hunting but with the motion of the strip being at a relatively rapid rate and the control being effected frequently the hunting is practically reduced to that which might be normally introduced in any event.

It will be observed that the circuitry and construction described is one which dispenses with the necessity of the conventional recording and reproducing apparatus and makes extremely simple commonly used devices function for the desired purpose and thus reduces substantially the overall expense of apparatus installation and performs the control operation with a minimum of inconvenience.

What is claimed is:

Apparatus for synchronizing movements of a motion-picture film and a magnetic sound-recording tape carrying two magnetic recording tracks, one track for recorded sound and one track pre-recorded with uniformly spaced magnetic indicia, comprising a motor-and-capstan drive for moving said tape at a constant speed, two electromagnetic transducers disposed to cooperate with respective ones of said tracks, whereby the transducer cooperating with the track on which said indicia are pre-recorded provides a first succession of electric pulses, one pulse during each movement of said tape through a certain distance, a motor-and-sprocket drive for moving said film, cam-and-switch means connected to said motor-and-sprocket drive for providing a second succession of electric pulses, one pulse during each movement of said film through a certain distance, the motor of said motor-and-sprocket drive being a variable-speed electric motor having a speed-controlling resistor connected thereto, a relay having a switch contact connected in parallel with said resistor, whereby the state of energization of said relay to close and open the switch contact, respectively, speeds up and slows down the motion of said film by controllably short-circuiting and including the resistor in the motor circuit to control the motor speed, a control circuit for selectively operating said relay to said one position and another, said control circuit including a pair of individually rotatable switch elements disposed to close said circuit when in angular alinement with each other and to open said circuit when in angular disalinement, two ratchet wheels connected to rotate respective ones of said switch elements, electromagnetic ratchet means for advancing one of said ratchet wheels through a certain angle responsive to each electric pulse of said first succession, and another electromagnetic ratchet means for advancing the other of said ratchet wheels through a certain angle responsive to each electric pulse of said second succession, whereby the motion of said film is automatically synchronized with the motion of said tape.

References Cited in the file of this patent

UNITED STATES PATENTS

| | | |
|---|---|---|
| 1,210,323 | Janssens | Dec. 26, 1916 |
| 2,486,082 | Wagner | Oct. 25, 1949 |
| 2,567,086 | Stoltz | Sept. 4, 1951 |
| 2,679,187 | Bitting | May 25, 1954 |
| 2,693,127 | Ortman | Nov. 2, 1954 |

FOREIGN PATENTS

| | | |
|---|---|---|
| 1,101,732 | France | Apr. 27, 1955 |
| 1,106,773 | France | July 27, 1955 |